United States Patent Office 3,424,738
Patented Jan. 28, 1969

3,424,738
METAL COMPLEX REACTIVE AZO DYESTUFFS
Herbert Francis Andrew, Manchester, England, assignor to Imperial Chemical Industries Limited, London, England, a corporation of Great Britain
No Drawing. Filed Oct. 19, 1964, Ser. No. 404,914
Claims priority, application Great Britain, Nov. 1, 1963, 43,220/63
U.S. Cl. 260—146      6 Claims
Int. Cl. C09b 45/06, 45/08, 45/10

ABSTRACT OF THE DISCLOSURE

Water-soluble metal complex azo dyestuffs having the formula $$A'-N(R)-C(=N-)-C(Y)=X-C(Z)=X-$$

wherein $A'$ is the radical of a water-soluble metal complex azo dye in which the metal is selected from the class consisting of copper, cobalt and chromium and the NR group is attached to a carbon atom of the dyestuff molecule and wherein R is hydrogen or lower alkyl. X can be =N— and $$-C(CH)=$$

Z can be chlorine or bromine and Y is (1) (nitrodiphenylamine)amino radicals containing one or two groups selected from $SO_3H$ and $CO_2H$ and which contain a single further substituent selected from $NO_2$ and methyl or (2) the radical of the formula $$NO_2-\langle\rangle(SO_3H)-CH=CH-\langle\rangle(HO_3S)-NH-$$

---

This invention relates to new metal complex azo dyestuffs and more particularly to new water-soluble metal complex azo dyestuffs which contain a reactive triazine or reactive pyrimidine nucleus, hence being suitable for the colouration of textile materials containing acylatable hydroxyl or amino groups, such as cotton, viscose rayon, wool, silk and nylon.

It is known, e.g., in part from United Kingdom specification No. 870,985, to prepare water-soluble metal complex azo dyestuffs which contain reactive triazinylamino or pyrimidinylamino groups in which the nuclei also carry a substituted amino group. By a "reactive" triazine or pyrimidine nucleus is meant a pyrimidine or triazine nucleus substituted on one of the carbon atoms in ortho position to a nuclear nitrogen atom by an atom or group which is replaced by hydroxyl when the dyestuff is treated with boiling, dilute, aqueous alkali.

According to the present invention there are provided new water-soluble metal complex azo dyestuffs of the formula:

$$A'-N(R)-C(=N-)-C(Y)=X-C(Z)=X- \quad (1)$$

where $A'$ represents the radical of a water-soluble metal complex azo dye having the NR group attached to a carbon atom of the dyestuff molecule; R represents a hydrogen atom or alkyl group; X represents a nitrogen atom or a carbon atom to which is attached a chlorine or bromine atom or a nitro or cyano group; Z stands for a labile atom or group (i.e., one displaced by hydroxyl when the dyestuff is treated with boiling, dilute, aqueous alkali); and Y represents a (nitrodiphenylamine)amino radical which contains at least one $SO_3H$ or $CO_2H$ group and may contain other substituents, or a radical of the formula:

$$NO_2-\langle\rangle(SO_3H)-CH=CH-\langle\rangle(HO_3S)-NH- \quad (2)$$

or $$NO_2-\langle\rangle(SO_3H)-CH=CH-\langle\rangle(HO_3S)-N\langle\begin{array}{c}N\\A\\N\end{array}\rangle-NR'- \quad (3)$$

wherein $R'$ stands for a hydrogen atom or a methyl or ethyl group and the benzene nucleus A can be further substituted.

As examples of labile atoms or groups represented by Z, there may be mentioned for example, bromine or preferably chlorine atoms, sulphonic acid groups, thiocyano groups, electro-negatively substituted aryloxy and arylthio groups, such as sulphophenoxy, sulphophenylthio, nitrosulphophenoxy, disulphophenoxy and sulphonaphthoxy groups, groups of the formula:

$$-S-C(\dot Y) \quad (4)$$

wherein Y represents the group of atoms necessary to form a 5- or 6-membered heterocyclic ring which may carry substituents or form part of a fused ring system; quaternary ammonium, e.g., pyridinium groups, groups of the formula:

$$-S-C(=S)-N(R^4)(R^4) \quad (5)$$

wherein $R^3$ and $R^4$ each represents the same or different alkyl, cycloalkyl, aryl or aralkyl groups, or $R^3$ and $R^4$ together form, together with the nitrogen atom, a 5- or 6-membered heterocyclic ring; and groups of the formula:

$$-S-C(=NR^5)(R^6) \quad (6)$$

wherein $R^5$ and $R^6$ may be the same or different and each represents a hydrogen atom or an alkyl, aryl or aralkyl group.

The nitrogen atom linking the heterocyclic nucleus to $A'$ is preferably attached to a carbon atom forming part of an aromatic ring, for example, a carbon atom of a benzene or naphthalene nucleus in $A'$.

The new water-soluble metal complex azo dyestuffs can be 1:1-metal complexes, for example 1:1-copper or 1:1-nickel complexes or can be 1:2-complexes, for example 1:2-chromium or 1:2-cobalt complexes. In the case of 1:2 complexes, they may be mixed complexes that is to say, one atom of the metal is bound in complex formation with two different azo compounds. The new water-soluble azo dyestuffs can be the metal complexes of dyestuffs containing more than one azo group, but in general are preferably of monoazo dyestuffs. In the case of complexes of monoazo dyestuffs, the latter can be, for example, of the 0:0'-dihydroxyazonaphthalene, or o-hydroxy- or o-carboxy-phenylazo pyrazolone series but is preferably of the o-hydroxy- or o-carboxyphenylazonaphthol series. Thus a preferred class of the new water-soluble metal complex azo dyestuffs is that represented by the formula:

$$[A-N=N-E-NRT]_n Me \quad (7)$$

where A is a benzene nucleus having a hydroxyl or carboxylic acid group in ortho position to the azo group and can carry further substituents, for example $NO_2$, Cl or $SO_3H$; —E—NR— is the radical of an aminonaphthol mono- or disulphonic acid in which R has the aforesaid meaning; T represents a chlorotriazine radical carrying the nitroamine radical, $n$ is 1 or 2, and Me is copper when $n$ is 1 or chromium when $n$ is 2; of particular interest are the 1:2-chromium complexes of dyes in which A is an o-carboxyphenyl radical, —E—NR— the radical of a 1-naphthol mono- or di-sulphonic acid having an amino or amino-sulphoanilino group in the 6- or 7-position of the naphthalene nucleus and the nitroamine radical is that of nitroaminostilbene disulphonic acid. These dyestuffs yield pure brown shades on cellulose not readily obtainable except by using mixed chromophores. As compared with comparable dyes containing a yellow azo moiety on the heterocyclic nucleus in place of the nitroamine radical, these dyestuffs exhibit better build-up properties and fastness to hypochlorite bleach. As compared with comparable dyes having a colourless amine radical on the heterocyclic nucleus in place of the nitroamine radical, these dyestuffs have higher tinctorial strength and better build-up properties and usually more attractive shades.

The new water-soluble metal complex azo dyestuffs in which Z stands for a chlorine atom or a bromine atom can be obtained by reacting together a water-soluble metal complex aminoazo compound of the formula:

$$A'-NHR$$

where A' and R have the meanings stated above, cyanuric chloride or cyanuric bromide or a 2,4,6-trichloro-pyrimidine or 2,4,6-tribromopyrimidine which contains a chlorine or a bromine atom or a nitro or cyano group in the 5-position of the pyrimidine nucleus and a yellow nitroamine of the formula: H.Y where Y has the meaning stated above. This process forms a further feature of the invention.

The above process can conveniently be carried out by stirring an aqueous solution of the water-soluble metal complex aminoazo compound with the cyanuric or pyrimidine trihalide until one halogen atom of the latter has reacted, then adding the nitroamine and stirring until a second halogen atom has reacted. Alternatively the reaction with the nitroamine can be effected first and the reaction with the metal complex aminoazo compound second. When using cyanuric chloride or cyanuric bromide, the first stage is usually conveniently (but not necessarily) carried out at a temperature between 0 and 10° C. and the second at between 30 and 50° C. When using pyrimidine trihalides it may be necessary to operate at slightly higher temperatures than these, for example, about 40° C.–50° C. higher.

The 2,4,6 - trichloro- or 2,4,6 - tribromo - pyrimidines which can be used are 2:4:5:6-tetrachloropyrimidine, 5-cyano-2:4:6-trichloropyrimidine, 5-cyano-2:4:6-tribromopyrimidine, 2:4:5:6 - tetrabromopyrimidine, 5-nitro-2:4:6-trichloropyrimidine and 5-nitro-2:4:6-tribromopyrimidine.

As examples of nitroamines which can be used, there may be mentioned for example:

4-amino-4'-nitrostilbene-2:2'-disulphonic acid
4-amino-4'-nitrodiphenylamine-2'-sulphonic acid
4-amino-2'-nitrodiphenylamine-3,4'-disulphonic acid
4-methylamino-2'-nitrodiphenylamine-3-4'-disulphonic acid
4-amino-2',4'-dinitrodiphenylamine-3-sulphonic acid
4-methylamino-2'-nitro-4'-carboxydiphenylamine-3-sulphonic acid
4-amino-2'-nitro-4'-N-β-hydroxyethylsulphamyl-diphenylamine-3-sulphonic acid
4-amino-2'-nitro-4'-trifluoromethyldiphenylamine-3-sulphonic acid
3-amino-2'-nitrodiphenylamine-4:4'-disulphonic acid
3-amino-4-carboxy-2'-nitrodiphenylamine-4'-sulphonic acid
3-amino-5-carboxy-2'-nitrodiphenylamine-4'-sulphonic acid
4-amino-2'-nitrodiphenylamine-4'-sulphonic acid
4-amino-4'-nitrodiphenylamine-2':3-disulphonic acid
4-amino-4'-nitro-3-methyldiphenylamine-2'-sulphonic acid
4-nitro-4'-(5''-aminobenztriazol-2''-yl)stilbene-2,2'-disulphonic acid
4-nitro-4'-(5''-amino-6''-methoxybenztriazol-2''-yl)stilbene-2,2'-disulphonic acid
4-nitro-4'-(5''-amino-6''-methylbenztriadol-2''-yl)stilbene-2,2'-disulphonic acid
4-nitro-4'-(5''-amino-6''-nitrobenztriazol-2''-yl)stilbene-2,2'-disulphonic acid
4-nitro-4'-(5''-amino-6''-chlorobenztriazol-2''-yl)stilbene-2,2'-disulphonic acid
4-nitro-4'-(5''-methylaminobentriazol-2''-yl)stilbene-2,2'-disulphonic acid
4-nitro-4'-(5''-amino-6''-sulphobenztriazol-2''-yl)stilbene-2,2'-disulphonic acid The water-soluble metal complex aminoazo compounds used in the process of the invention can be obtained by the usual methods, for example, by subjecting metallisable azo dyestuffs that contain in addition to the grouping capable of forming the metal complex, for example, an o-hydroxy-o'-carboxy azo grouping or an o,o'-dihydroxyazo grouping, an acylatable amino group of the formula —NHR, to the action of a metallising agent. Such metallisable azo dyestuffs can be obtained, for example, by coupling an o-hydroxy, o-methoxy- or o-carboxy diazo compound of the benzene or naphthalene series or of the azo benzene or phenylazonaphthalene series, with a coupling component which is capable of coupling in vicinal position to a hydroxy group or enolisable ketone group, and which contains the aforesaid acylatable amino group. As examples of such coupling components, there may be mentioned, for example, 2-amino-5-naphthol-7-sulphonic acid and its 1-chloro- and 1-sulpho- derivatives, 2-methylamino-5-naphthol-7-sulphonic acid, 2-amino-8-naphthol-6-sulphonic acid, 2-methylamino-8-naphthol-6-sulphonic acid, 2 - (4' - amino - 3' - sulphophenylamino) - 5 - naphthol - 7-sulphonic acid 2-(4'-amino-3'-sulphophenylamino)-8-naphthanol-6-sulphonic acid, 1,8-aminonaphthol-3,6- and 4,6-disulphonic acids and 1-(3'-aminophenyl)-3-carboxy- and 3-methyl-5-pyrazolones. As examples of diazo compounds to be coupled with these coupling components, there may be mentioned, for example 2-aminophenol, 2-aminophenol-4-sulphonic acid, 4-chloro- and 4-nitro-2-aminophenol-6-sulphonic acids, 6-chloro- and 6-nitro-2-aminophenol-4-sulphonic acids, 4-methylsulphonyl-2-aminophenol, 4-sulphamyl-2-aminophenol, 6-nitro-1-amino-2-naphthol-4-sulphonic acid, anthranilic acid, 4- and 5-chloroanthranilic acids, 4- and 5-nitroanthranilic acids, and 4- and 5-acetylaminoanthranilic acids.

Useful metallisable azo dyestuffs are obtained also by reducing metallisable azo dyestuffs containing nitro groups or by hydrolysing metallisable dyestuffs containing acylamino groups, for example, by splitting the acyl group of dyestuffs obtainable from o-hydroxy or o-carboxy diazo compounds of the benzene series and coupling components which are capable of coupling in vicinal position to a hydroxyl group or enolisable group. In addition to the coupling components of this kind mentioned above, there may be used others which do not already contain an acylatable amino group, for example, 2-(3'- and 4'-sulphoanilino)-8-naphthol-6-sulphonic acids, 1-amino-8-naphthol-2,4-disulphonic acid, 1-phenyl-3-methyl- and 3-carboxy-5-pyrazolones, 1-(4'-sulphophenyl)-3-methyl-5-pyrazolone and 1-(2',5'-dichloro-4'-sulphophenyl)-3-methyl-5-pyrazolone.

The conversion of the metallisable azo dyestuff into the complex metal compound can be effected by heating an aqueous solution thereof with the appropriate metal-yielding agent. Where convenient, the metallisation can be performed in situ upon completion of formation of the metallisable azo dyestuff. Suitable metal-yielding agents are, for example, those which yield manganese, iron, aluminium and above all, cobalt, nickel, copper and chromium as the cation, for example, chromium sulphate, cobalt acetate, cobalt sulphate, copper sulphate, or copper acetate. In some cases it is advantageous to use a complex metal compound, for example, in the form of a metal-amine complex, such as copper tetramine sulphates from ammonia, pyridine or monoethanolamine in the demethylative coppering of an o-methoxy-o'-hydroxy-azo group.

The treatment with the metal-yielding agent can be performed by the usual methods, e.g., by heating at a temperature of 50 to 120° C. in an open vessel, for example, acid coppering is performed with copper sulphate, alkaline coppering with cuprammonium sulphate. If desired the metallisation can be performed in the presence of a solvent for example, ethanol, dimethylformamide or ethylene glycol monomethyl ether.

Alternatively the water-soluble metal complex amino-azo compounds used in the process of the invention can be made by first synthesizing a water-soluble metal complex azo dyestuff containing a nitro group or an acylamino group and thereafter reducing or hydrolysing the dyestuff as necessary to form an acylatable amino group.

The new water-soluble metal-complex azo dyestuffs of the invention wherein Z of Formula 1 represents a quaternary ammonium group can be obtained by stirring an aqueous solution of a tertiary amine and the corresponding dyestuff in which Z represents a chlorine or a bromine atom. The new water-soluble metal-complex azo dyestuffs of the invention in which Z of Formula 1 represents a labile group other than a quaternary ammonium group can be obtained by stirring an aqueous solution of a compound of the formula H.Z or an alkali metal salt such as sodium or potassium salt, thereof and the corresponding dyestuff in which Z represents a chlorine or a bromine atom. These processes also form further features of the invention.

As examples of tertiary amines which can be used, there may be mentioned for example, trimethylamine, pyridine, 1,4 - diaza - [2,2,2]bicyclo octane, 3 - carboxypyridine, N-methylisoindoline, N-ethylisoindoline and N:N-dimethylhydrazine.

As examples of compounds or alkali metal salts of compounds of the formula H.Z which may be used there may be mentioned for example, alkali metal sulphites such as sodium sulphite and sodium bisulphite; alkali metal thiocyanates especially potassium thiocyanate; electronegatively substituted phenols and aryl mercaptans such as o-, m- and p-sulphophenols, nitrosulphophenols, disulphophenols, sulphothiophenols and sulphonaphthols; the alkali metal salts of compounds of the formula:

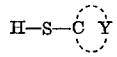
(8)

wherein Y represents the group of atoms necessary to form a 5- or 6-membered heterocyclic ring which may carry substituents or form part of a fused ring system such as mercaptobenzthiazole; alkali metal salts of the formula:

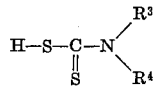
(9)

wherein $R^3$ and $R^4$ have the meanings stated above, such as sodium diethyldithiocarbamate and alkali metal salts of compounds of the formula:

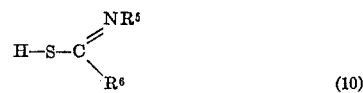
(10)

wherein $R^5$ and $R^6$ have the meanings stated above such as thioacetanilide and thioacetamide.

The dyestuffs obtained by the processes of the invention can be isolated by the usual means preferably by salting followed by filtration, but also for example, by direct drying of the whole condensation mixture, for example, by spray drying. If desired diluents such as urea, sodium chloride and/or sucrose, can be added before drying.

The new metal-complex water-soluble azo dyestuffs are valuable for colouring cellulose textile materials, for example, textile materials comprising natural or regenerated cotton. For colouring such textile materials, the new dyestuffs are preferably applied, either by a dyeing or printing process, to the cellulose textile materials in conjunction with a treatment with an acid-binding agent, for example sodium hydroxide, sodium carbonate or sodium bicarbonate, which may be applied to the cellulose textile material before, during or after the application of the dyestuffs. Alternatively when the colouration process involves the use of a heating step a substance can be used, for example, sodium trichloroacetate, which is changed into an acid-binding agent during the heating step. When so applied to cellulose textile materials especially from long liquor ratio dyebaths, the new water-soluble metal-complex azo dyestuffs react with the cellulose and can be built up to given strong shades having very good fastness to light and to wet treatments especially to severe washing.

The invention is illustrated but not limited by the following examples in which parts and percentages are by weight:

EXAMPLE 1

A solution of 33.1 parts of the sodium salt of 4-nitro-4'-aminodiphenylamine-2-sulphonic acid in 200 parts of water is added during 15 minutes to a solution of 59.25 parts of the trisodium salt of the 1:2-chromium complex of 2-(4':6'-dichloro-1':3':5'-triazin-2'-ylamino-6-(2'''-carboxy phenylazo)-5-naphthol-7-sulphonic acid (which may be obtained as described in Example 1 of British patent specification No. 878,527) in 800 parts of water. The mixture is heated for 2½ hours at 40°–45° C., the pH of the condensation mixture being held at 6.8 to 7 by the addition of a 10% aqueous solution of sodium carbonate. The solution is then treated with 90 parts of sodium chloride and the product which is precipitated is filtered off and is then dried.

The product so obtained contains 0.9 atom of hydrolysable chlorine for each azo group present. When applied to cellulose textile materials in conjunction with a treatment with an acid-binding agent the dye yields strong brown shades possessing good fastness to washing and to light.

EXAMPLE 2

A solution of 17.76 parts of the disodium salt of 4-nitro-4'-aminostilbene-2:2'-disulphonic acid in 270 parts of water is added to a solution of 28.6 parts of the pentasodium salt of the 1:2-cobalt complex of 2-(4'':6''-dichloro-1'':3'':5''-triazin-2''-ylamino) - 6 - (5' - nitro-2'-hydroxyphenylazo)-5-naphthol-3':7-disulphonic acid in 300 parts of water and the mixture is heated for 2½ hours at a temperature between 40° C. and 45° C., the pH being maintained between 6.8 and 7 by the addition of a 10% aqueous solution of sodium carbonate. The solution is then treated with 60 parts of sodium chloride and the product which is precipitated is filtered off and is then dried.

The product so obtained contains 0.99 atom of organically bound chlorine for each azo group present. When applied to cellulose textile materials in conjunction with a treatment with an acid-binding agent, the dye yields mid-brown shades possessing good fastness to washing and to light.

The cobalt complex azo compound used in the above example can be obtained by coupling the diazonium compound from 4-nitro-2-aminophenol-6-sulphonic acid with 2-amino-5-naphthol-7-sulphonic acid, heating the product so obtained in aqueous solution with 1.1 gram mole of cobalt acetate, and stirring 22 parts of the product so obtained with 7.5 parts of cyanuric chloride at 0–5° C. for ½ hour. The solution from this stage can be used directly.

EXAMPLE 3

A solution of 29.6 parts of the disodium salt of 4-nitro-4'-aminostilbene-2:2'-disulphonic acid in 400 parts of water is added to a solution of 27.6 parts of the trisodium salt of the copper complex of 1-(4''':6'''-dichloro-1''':3''':5''' - triazin-2'''-ylamino)-8-hydroxy-7-(2'-hydroxy-3' - chlorophenylazo)naphthalene-3:5:6-trisulphonic acid (which may be obtained as described in Example 7 of British patent specification No. 838,311) in 400 parts of water and the mixture is heated for 2½ hours at a temperature between 40° and 45° C. the pH of the mixture being maintained between 6.8 and 7 by the addition of a 10% aqueous solution of sodium carbonate. The solution is then treated with 80 parts of potassium chloride and the product which is precipitated is filtered off and dried.

The product so obtained contains 1.1 atom of organically bound chlorine for each azo group present. When applied to cellulose textile materials in conjunction with a treatment with an acid-binding agent the dye yields red-brown shades having good fastness to washing and to light.

The following table gives the shades of further examples of the invention which are obtained as described in Examples 1, 2 and 3 by condensing the aminoazo compound listed in column 2 with an equimolecular proportion of the heterocyclic compound listed in column 3 and condensing the compound so obtained with an equimolecular proportion of the nitroamine listed in column 4 of the table.

| Example | Aminoazo compound | Heterocyclic compound | Nitroamine | Shade |
|---|---|---|---|---|
| 4 | Copper complex of 2-(4''-amino-3''-sulphophenylamino)-5-hydroxy-6-(2'-carboxyphenyl)naphthalene-7-sulphonic acid. | Cyanuric chloride | 4-nitro-4'-aminostilbene-2:2'-disulphonic acid. | Dull red. |
| 5 | Copper complex of 2-amino-5-hydroxy-6-(2'-hydroxy-5'-sulphophenylazo)-naphthalene-1:7-disulphonic acid. | ...do... | ...do... | Reddish-brown. |
| 6 | 1:2-chromium complex of 2-amino-5-hydroxy-6-(2'-carboxyphenylazo)-naphthalene-7-sulphonic acid. | ...do... | ...do... | Brown. |
| 7 | Copper complex of 6-amino-1-hydroxy-2-[4'-(2'':5''-disulphophenylazo)-2'-hydroxy-5'-methylphenylazo]-naphthalene-3:5-disulphonic acid. | ...do... | ...do... | Greenish-grey. |
| 8 | 1:2-cobalt complex of 2-amino-5-hydroxy-6-(2'-hydroxy-3'-sulpho-5'-nitrophenylazo)naphthalene-1:7-disulphonic acid. | ...do... | ...do... | Brown. |
| 9 | 1:2-cobalt complex of 2-amino-8-hydroxy-7-(2'-hydroxy-3'-sulpho-5'-nitrophenylazo)naphthalene-6-sulphonic acid. | ...do... | ...do... | Khaki. |
| 10 | Copper complex of 1-amino-8-hydroxy-7-(2'-hydroxy-5'-aminophenylazo)naphthalene-2:3':4-trisulphonic acid. | ...do... | ...do... | Grey. |
| 11 | Copper complex of 8-amino-6'-nitro-1:2'-dihydroxy-2:1'-azonaphthalene-3:4':6-trisulphonic acid. | ...do... | ...do... | Do. |
| 12 | Copper complex of 6-amino-1-hydroxy-2-[1':5'-dihydroxy-6'-phenylazo-naphth-2'-ylazo]naphthalene-2'':3:4'':5:7'-pentasulphonic acid. | ...do... | ...do... | Green. |
| 13 | Copper complex of 8'-amino-1-hydroxy-2=[1':5'-dihydroxy-6'-phenylazo-naphth-2'-ylazo]naphthalene-2-':3:5:5'':7'-pentasulphonic acid. | ...do... | ...do... | Do. |
| 14 | Copper complex of 8-amino-1-hydroxy-2-[1':5'-dihydroxy-6'-phenylazo-naphth-2'-ylazo]naphthalene-2'':3:4'':5:7'-pentasulphonic acid. | ...do... | ...do... | Do. |
| 15 | 1:1 Nickel complex of 6-amino-1-hydroxy-2-[4'-(2'':5''-disulphonphenylazo)-2'-hydroxy-5'-methylphenylazo]-naphthalene-3,5-disulphonic acid. | Cyanuric bromide | 4-methylamino-2'-nitro-diphenylamine-3',4'-disulphonic acid. | Grey. |
| 16 | Mixed 1:2-cobalt complex of 2-amino-6-(2'-hydroxy-5'-nitro-3'-sulphophenylazo)-5-naphthol-1,7-disulphonic acid and 1-(3'-aminophenyl)-3-methyl-4-(2''-hydroxy-5''-sulphophenylazo)-5-pyrazolone. | 5-cyano-2,4,6-trichloropyrimidine. | 4-amino-2',4'-dinitrodiphenylamine-3-sulphonic acid. | Brown. |
| 17 | 1:2-chromium complex of 2-amino-6-(2'-carboxyphenylazo)-5-naphthol-7-sulphonic acid. | Cyanuric chloride | 4-amino-4'-nitro-3-methyl-diphenylamine-2-sulphonic acid. | Do. |
| 18 | 1:2-chromium complex of 2-amino-6-(2'-carboxyphenylazo)-5-naphthol-7-sulphonic acid. | ...do... | 4'''-nitro-4''-(4'-amino-5'-methoxy-1':2':4:5-benztriazol-2-yl)-stilbene-2'':2'''-disulphonic acid. | Do. |
| 19 | ...do... | ...do... | 4'''-nitro-4''-(4'-amino-5'-chloro-1':2':4:5-benztriazol-2-yl)-stilbene-2'':2'''-disulphonic acid. | Do. |
| 20 | ...do... | ...do... | 4'''-nitro-4''-(4'-amino-5'-sulpho-1':2':4:5-benztriazol-2-yl)-stilbene-2'':2'''-disulphonic acid. | Do. |
| 21 | 1:1-copper complex of 1-(2':5'-dichloro-4'-sulphophenyl)-3-methyl-4-(4''-amino-2''-carboxyphenylazo)-5-pyrazolone. | ...do... | 4-nitro-4'-aminostilbene-2:2'-disulphonic acid. | Yellow. |
| 22 | 1:2-chromium complex of 2-(3'-sulphophenylamino)-7-(4'-amino-2'-carboxyphenylazo)-8-naphthol-6-sulphonic acid. | ...do... | ...do... | Brown. |
| 23 | 1:2-chromium complex of 2-methylamino-6-(2'-carboxy-4'-chlorophenylazo)-5-naphthol-7-sulphonic acid. | ...do... | ...do... | Do. |
| 24 | 1:2-chromium complex of 2-N-butylamino-6-(2'-carboxyphenylazo)-5-naphthol-7-sulphonic acid. | ...do... | ...do... | Do. |
| 25 | 1:1-copper complex of 2-amino-6-(2'-hydroxy-5'-sulphonamidophenylazo)-5-naphthol-1:7-disulphonic acid. | ...do... | ...do... | Reddish-brown. |
| 26 | 1:2-chromium complex of 2-(4'-amino-2'-carboxyphenylazo)-8'-amino-1-naphthol-5,7-disulphonic acid. | ...do... | ...do... | Grey. |

EXAMPLE 27

A solution of 22.5 parts of sodium diethyldithiocarbamate trihydrate in 100 parts of water is added to a solution of 125.5 parts of the pentasodium salt of the dyestuff obtained as described in Example 3, in 700 parts of water. The resulting mixture is stirred and heated for 3 hours at a temperature of 22° C. The solution is then treated with 80 parts of potassium chloride and the product which is precipitated is filtered off and dried.

The product so obtained contains 4.91 atoms of organically bound sulphur for each azo group present. When applied to cellulose textile materials in conjunction with a treatment with an acid-binding agent the dye yields red-brown shades having good fastness to washing and to light.

The following table summaries further examples of the invention obtained by a process similar to that described above. The dyestuff listed in the second column of the table is reacted with the compound listed in the third column under the conditions stated in the fourth column and the fifth column of the table indicates the shades obtained on cellulose textile materials.

I claim:
1. Water-soluble metal complex azo dyestuffs of the formula

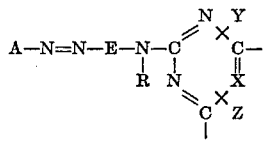

of nitro, chlorine, sulphonic acid and sulphonamide;

represents a radical selected from the class consisting of aminonaphthol mono- and disulphonic acid in which R is selected from the class consisting of hydrogen and lower alkyl;

X is a radical selected from the class consisting of

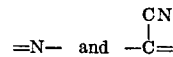

Z is selected from the class consisting of chlorine and bromine; and

Y is a member selected from the group consisting of (1) (nitrodiphenylamine)amino radicals containing 1-2 groups selected from the class consisting of $SO_3H$ and $CO_2H$ and up to one further substituent

| Example | Dyestuff of example No. | Compound | Time hours | Temp. °C. | Shade |
|---------|-------------------------|----------|------------|-----------|-------|
| 28 | 1 | 2-mercaptobenzthiazole | 12 | 50 | Brown. |
| 29 | 2 | 2-mercaptopyridine | 12 | 50 | Mid-brown. |
| 30 | 6 | N:N-dimethylhydrazine | 3 | 20 | Brown. |
| 31 | 11 | 2:4-dinitrothiophenol | 3 | 25 | Grey. |
| 32 | 14 | 2-nitro-4-sulphophenol | 6 | 70 | Green. |
| 33 | 9 | Thioacetamide | 12 | 50 | Khaki. |
| 34 | 5 | Thioacetanilide | 12 | 50 | Reddish-brown. |
| 35 | 17 | Pyridine | ½ | 85 | Brown. |
| 36 | 21 | 1:4-diaza-2:2:2-bicyclo-octane | ¼ | 20 | Yellow. |
| 37 | 4 | Sodium sulphite | 1 | 30 | Dull red. |
|  |  |  | 16 | 20 |  | wherein the metal is selected from the group consisting of copper, cobalt and chromium;

A represents a nucleus selected from the class consisting of benzene, naphthalene and phenylazo groups, said nucleus having a group selected from the class consisting of hydroxyl and carboxylic acid in ortho position to the azo group and which may carry substituents selected from the group consisting selected from the clas consisting of $NO_2$ and methyl, and (2) a radical of the formula

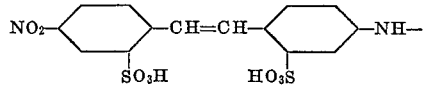

2. The 1:2-chromium complex of the azo compound of the formula:

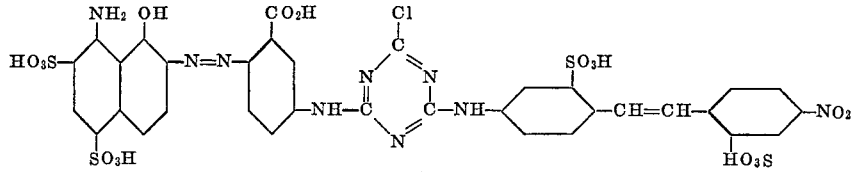

3. The 1:2-chromium complex of the azo compound of the formula:

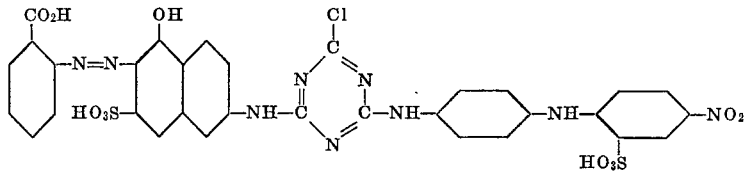

4. The 1:2-chromium complex of the azo compound of the formula:

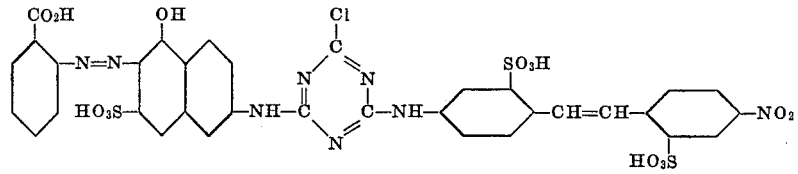

5. The 1:1-copper complex of the azo compound of the formula:
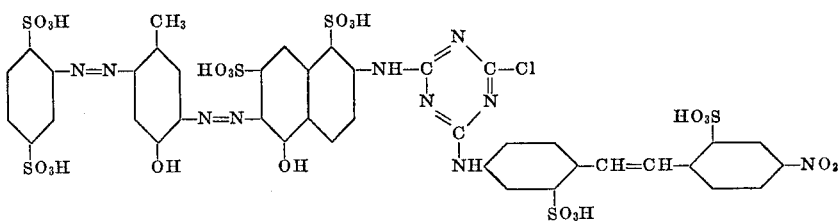
6. The 1:2-cobalt complex of the azo compound of the formula:
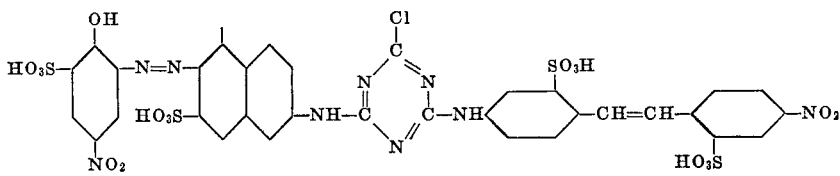
References Cited
UNITED STATES PATENTS
3,354,140  11/1967  Benz et al. _____ 260—146
CHARLES B. PARKER, *Primary Examiner.*
D. M. PAPUGA, *Assistant Examiner.*
U.S. Cl. X.R.
260—153, 154, 151, 148, 150, 145, 147, 249.8, 249.5, 256.4; 8—42